UNITED STATES PATENT OFFICE.

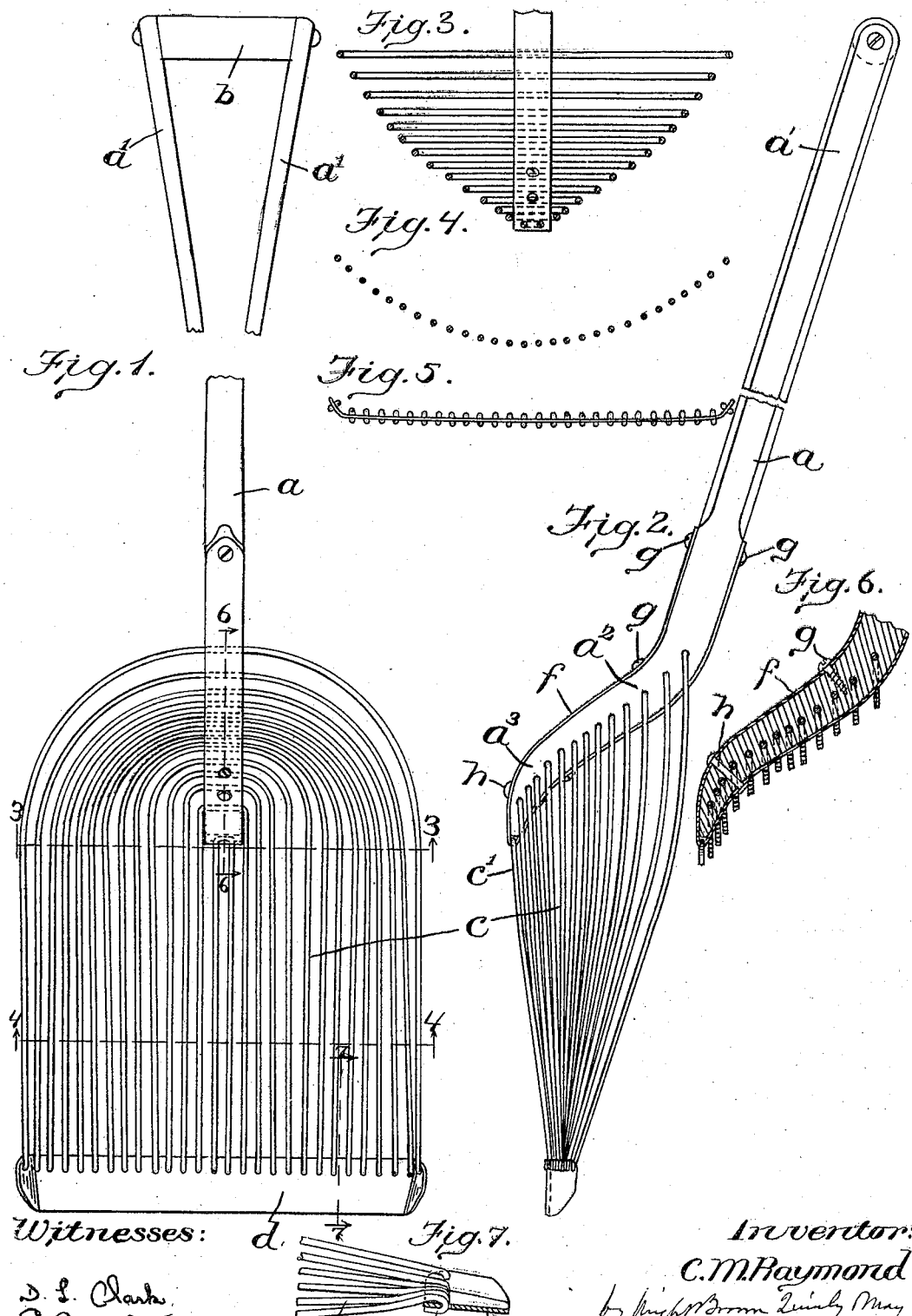

CADWALLADER M. RAYMOND, OF SOMERVILLE, MASSACHUSETTS.

SHOVEL FOR SIFTING.

1,237,218.

Specification of Letters Patent.  Patented Aug. 14, 1917.

Application filed November 10, 1913.   Serial No. 800,032.

*To all whom it may concern:*

Be it known that I, CADWALLADER M. RAYMOND, a citizen of the United States, and resident of Somerville, in the county of Middlesex and State of Massachusetts, have invented certain new and useful Improvements in Shovels for Sifting, of which the following is a specification.

The present invention relates to a shovel adapted to be used not only for the ordinary purposes of a shovel but also for the purpose of separating lumps or pieces of solid material from fine pulverulent material, as bits of coal or cinders from ashes, for removing solid objects from liquid and in general for effecting separation between substances which will pass through a sieve and other substances which will not. My invention broadly stated consists in a structure which enables a shovel to combine the ordinary functions of a shovel with the functions of a sieve. The manner in which I prefer to construct the shovel in order to secure the desired object is illustrated in the accompanying drawings and described in the following specification.

In the drawings,

Figure 1 is a front elevation of a shovel made in accordance with my invention and embodying the preferred form thereof.

Fig. 2 is a side elevation of the shovel.

Fig. 3 is a cross section taken on line 3—3 of Fig. 1.

Fig. 4 is a cross section taken on line 4—4 of Fig. 1.

Fig. 5 is an elevation or edge view of the end of the shovel.

Fig. 6 is a detailed sectional view taken on line 6—6 of Fig. 1.

Fig. 7 is a detailed sectional view taken on line 7—7 of Fig. 1.

The same reference characters indicate the same parts in all the figures.

The shovel handle is indicated at $a$ and is made as a bar of suitable length with a hand grip $b$ of any desired form and character. As here shown the hand grip is a short bar inserted between the spread apart sides $a'$ of the hand bar, in a well known manner.

The scoop portion $c$ of the shovel is made of wires or rods bent into U-shape and passed through the handle at their central portions. The several rods or wires are of different lengths and differently formed in bending so that when assembled in connection with the handle in the manner shown in Fig. 1, the wires form the lines of a shovel and their free ends all terminate in approximately a straight transverse line. Such free ends are all connected with a thin strip $d$, conveniently of sheet steel, or other metal, which has holes through which the ends of the wires are passed, such ends being bent sharply back under the strip $d$, as indicated at $e$ in Fig. 7.

The end of the handle bar nearest to the shovel proper or scoop is bent backward at $a^2$ and forward again at $a^3$. The part of the handle from the first bend to the lower end is the part which receives the wires or rods, and which, in connection with the U-shape of said wires and the differences in the forms given to the several wires, causes the wires to define a scoop very similar to that of an ordinary shovel, with a straight entrance edge and a deep concavity between its sides at the rear. The views designated Fig. 3, Fig. 4, and Fig. 5, show the transverse shape of the scoop and illustrate the increasing concavity and depth from its front edge to the back.

The wires may be attached to the handle in any desirable and convenient way. In the form shown they are passed directly through the handle, which is strengthened and prevented from splitting by a strap $f$ which lies on the front and rear faces of the handle bar and passes around its end, as shown best in Figs. 2 and 6. This strap is fastened by screws $g$ and a rivet $h$. The central bent wire $c'$ is held by the strap alone, being passed through the strap at the point where the strap is doubled back at the end of the handle, instead of through the wooden bar handle, as shown in Fig. 2.

A shovel made to embody the essential principles of this invention may be varied greatly in size and proportions. The wires may be as numerous or as few, and placed as closely together or as far apart, as may be required by the purpose for which any particular shovel is made.

Among other uses for which this shovel is adapted may be mentioned that of sifting ashes. The shovel may be used for removing the refuse from the ash pit of a furnace, and while being thus used, may also serve to separate the pieces of unburned fuel or cinders from the ash. This may be done by slightly shaking the shovel while still in the ash pit. The dust produced by shaking remains in the ash pit and is carried by the draft through the furnace. In this way the unburned fuel may be separated from the ash with no more difficulty than is required merely to shovel the ash from the ash pit, and without raising an objectionable dust. After the cinders have been separated from the fine ash in the manner indicated, the ash may also be removed by the same shovel, for the wires are close enough together for the fine ash to bridge the intermediate spaces, provided the shovel is not shaken. It will be readily seen that the shovel is particularly adapted for domestic use in connection with the furnaces of dwelling houses. A closely analogous use which the shovel serves is the separation of the lumps of coal from coal dust, whereby the coal may be screened during the act of shoveling the coal from a bin into the furnace.

Many other uses may be served by this shovel. For instance, the shovel may be used in garden work for separating stones and sod from the soil, for digging potatoes, and like uses. It may also be used for shoveling cracked ice when it is desired to have the ice free from water, and in general it may be said that wherever one desires to obtain solid pieces or articles separate from finer material or liquid with which they are mixed, my shovel will serve the desired purpose.

For different uses it may be desirable to have differences in form or arrangement of the scoop part with respect to the handle. For instance, in some cases the concavity of the scoop portion should be rather shallow and in other cases it is desirable to have it deep. Also some uses require that the angle between the handle and the scoop part of the shovel should be small, that is, that the scoop should extend more or less nearly in line with the handle, while other uses are better served by having the scoop portion at a more abrupt angle to the handle. The construction of the shovel already described provides a means by which a shovel having the same parts all constructed in the same way may be readily modified to serve such diverse purposes. As the wires of which the shovel scoop is made pass through the handle bar, they have a pivotal mounting in such bar and may thereby be swung more or less pivotally with respect to the handle. This fact together with the downward and backward curvature of the lower end of the handle bar enables the scoop to be given any depth desired at any angle with respect to the handle. Before the edge strip is fastened to the wires the latter are free to swing about their pivotal connections with the handle bar. In giving the final shape to any particular shovel the wires are engaged with the handle bar and their ends then brought against a flat surface or any other sort of gage. By swinging the handle bar in either direction transversely to the planes of the several curved wires, the wires at their rear are more or less elevated or lowered. In this way the depth of the scoop is increased or diminished. In so moving the handle bar the ends of the wires are moved longitudinally relatively to each other. For example, in so moving the handle bar as to increase the depth of the scoop the outermost wires are moved forward at their ends with respect to the inner wires, while the latter are relatively withdrawn or moved back with respect to the outer wires. The converse is true when the handle bar is so moved as to diminish the depth of the scoop. The edge strip when secured to all of the wires prevents this relative endwise movement and thus constitutes a tying or locking means which maintains the form of the scoop. In designing the shovel the wires may in the first place be cut to predetermined designed lengths according to the form of shovel to be made, and then the handle and wires may be manipulated substantially as indicated until the ends of all the wires are in line. This sort of manipulation results in giving the shovel the exact predetermined form. Or the wires may be cut in the first instance without regard to the shape of the finished shovel and manipulated as described until the shovel scoop has the required depth. Then the wires may all be cut off to a straight transverse line and secured to the edge piece.

The manner of securing the wires to the edge piece which I have shown is not the only one which I propose to employ. For example, in some instances I have formed the union between the wires and edge piece by welding, by which I have secured a very satisfactory firm union with incidental stiffening of the edge piece. Any union which gives the desired security of connection between wires and edge may be employed without departing from the spirit of the invention.

I have used the terms "wires" and "rods" in describing the elements c of which scoop portion of the shovel is made. I do not intend these terms to be in any sense a limitation in the materials or devices used to make this part of the shovel.

What I claim and desire to secure by Letters Patent is,

A shovel comprising a shank having a series of transverse passages through it near one end, the several passages being at different distances from such end and all of said passages being straight and parallel to one another, and a series of wires bent into U form arranged with their central parts in said passages, each wire in one of the passages, and their legs approximately parallel; the legs of each wire more distant from the end of the shank being wider apart than those of the wires nearer such end, whereby the wires collectively form a scoop; and all of the wires, including the one farthest from the end of the shank, being pivotally mounted in the respective passages and their ends separate from one another, whereby the scoop may be made shallower or deeper by turning all the wires in one direction or the other about their pivot connections with the shank.

In testimony whereof I have affixed my signature, in presence of two witnesses.

CADWALLADER M. RAYMOND.

Witnesses:
    ARTHUR H. BROWN,
    P. W. PEZZETTI.

Copies of this patent may be obtained for five cents each, by addressing the "Commissioner of Patents, Washington, D. C."